Jan. 12, 1954     F. A. DE WIESS     2,665,870
ADJUSTABLE BRACKET STRUCTURE
Filed May 27, 1950
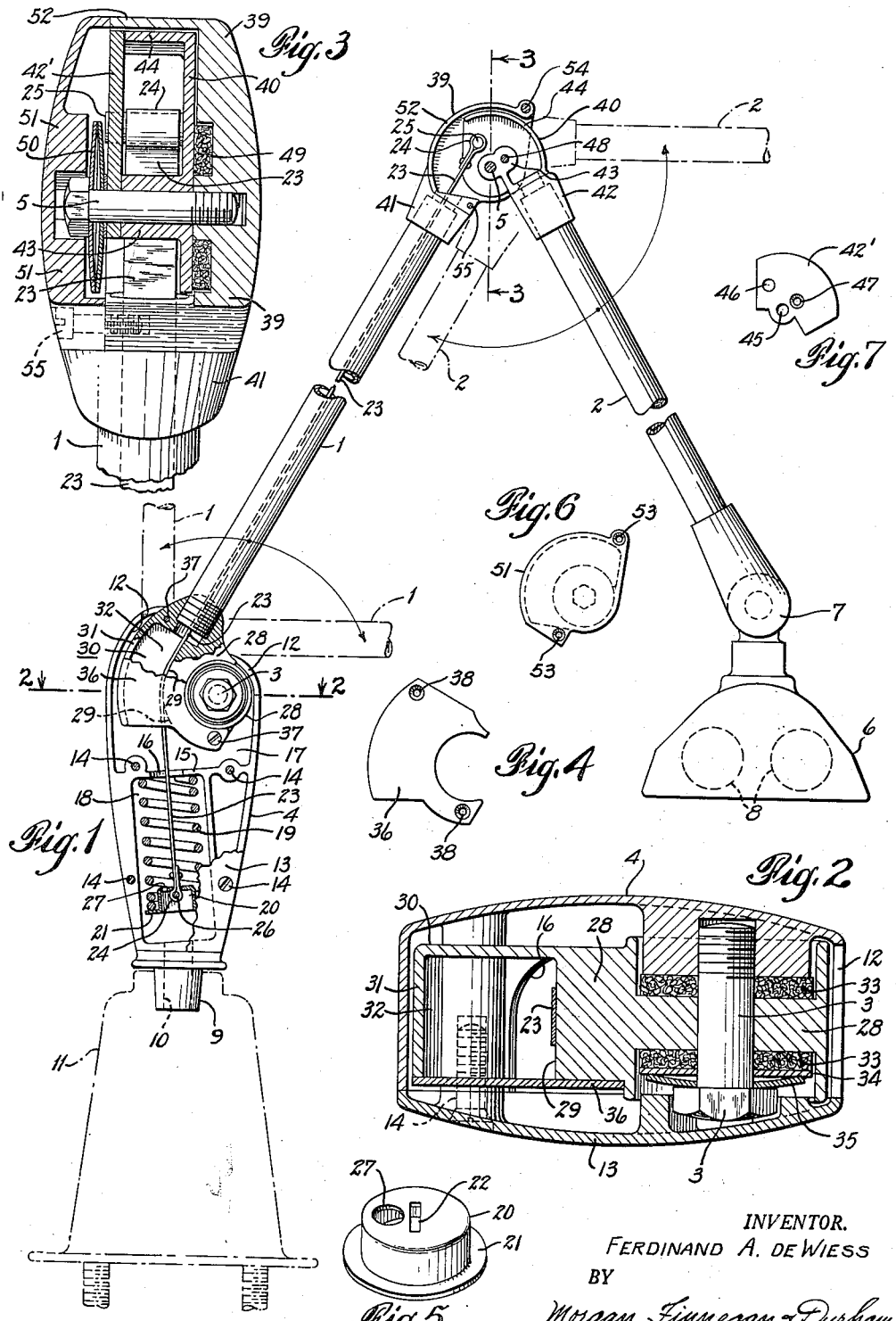
INVENTOR.
FERDINAND A. DE WIESS
BY
Morgan, Finnegan & Durham
ATTORNEYS.

Patented Jan. 12, 1954

2,665,870

UNITED STATES PATENT OFFICE 2,665,870

ADJUSTABLE BRACKET STRUCTURE

Ferdinand A. de Wiess, New York, N. Y., assignor to Milton Fletcher, New York, N. Y.

Application May 27, 1950, Serial No. 164,717

5 Claims. (Cl. 248—280)

This invention relates to adjustable bracket structures and is illustrated as embodied in an adjustable lamp structure adapted for attachment in known manner to a desk, table or like object relative to which the structure is adjustable by the user to position the lamp at various heights and positions in each of which the lamp structure is positionally stabilized.

It is an object of this invention to effect certain new and useful improvements in adjustable bracket structures so as to enable the obtainment of economies in their manufacture, and simplification in their parts, construction and arrangement, through the provision of novel and improved position stabilizing means in accordance with this invention. To this end and in accordance with features of this invention, the illustrated bracket structure comprises a support which is mounted in suitable fashion for pivotal movement on a vertical or substantially vertical axis through the provision of suitable means by which the structure as a whole may be secured to or mounted on the table or other object with which it is to be used. A two part hinged bracket arm is attached pivotally by one part to the support for angular displacement on a horizontal pivot axis to which the hinge axis of the arm is substantially parallel. The other or outer part of the bracket arm carries a lamp unit of suitable configuration. Elastic means yieldably coupling said other part to said support are provided for equilibrating the thus loaded bracket arm on the horizontal pivot axis. The equilibration of the bracket arm on said horizontal axis by the elastic coupling means is such that the bracket arm will remain statically balanced in any position to which it is angularly displaced on the horizontal pivot axis, and, in any such position, angular displacement of the outer part of the bracket arm will be accompanied by a compensatory balancing movement of the elastic coupling means, without any angular displacement of the inner part of the bracket arm.

In accordance with this invention, moreover, the elastic coupling means is connected at its one end to the bracket support and at its other end to the outer part of said hinged bracket arm at a locus radially spaced from the hinge axis of said arm to constitute said outer part a first class lever. Cam means carried by the inner part of the hinged bracket arm at its horizontal-pivot end serve to attach the bracket pivotally to the support, the cam means being disposed in running engagement with said elastic coupling means intermediate its ends for maintaining the latter in radially spaced relation to said horizontal pivot axis whereby said elastic coupling means forms a tangent between said locus and a point on the circumference of a circle concentric with said horizontal pivot axis. In this way, movement of the inner part of said jointed bracket arm on said horizontal axis from a position of stable equilibrium tending to unbalance the equilibrium tension on the elastic means is automatically accompanied by a compensatory movement of the elastic means serving to preserve the stable equilibrium of the arm as a whole on the pivot axis in all positions of adjustment thereon.

These and other features of this invention which will be pointed out in the claims and described in the specification are illustrated in the accompanying drawings, in which Fig. 1 is a partly broken view in side elevation with parts broken away to show certain interior details of construction of the pivotally mounted bracket support and the jointed bracket arm of this invention; the view is showing also, in dash-dot lines, typical limiting positions of the inner and outer parts of the jointed bracket arm and showing, also in dash-dot lines, conventional means for securing the device as a whole to the table or other object with which it is to be used;

Fig. 2 is a view in section taken along the line 2—2 of Fig. 1 showing details of the inner end of the bracket arm;

Fig. 3 is a view in section taken along the line 3—3 of Fig. 1 showing details of the hinge portion of the bracket arm;

Fig. 4 is a view in plan of the retaining cover, also shown in section in Fig. 2 and as partly broken away in Fig. 1, which is carried by the inner end of the jointed bracket arm;

Fig. 5 is a view in perspective of a coupling member, shown in section in Fig. 1, which serves detachably to connect elements of the elastic coupling means within the bracket support;

Fig. 6 is a view in plan of the cover, also shown in section in Fig. 3, for the hinge portion of the jointed bracket arm; and, Fig. 7 is a view in plan, also shown in section in Fig. 3, of a retaining member which is removably secured to the enlarged hinge end of the outer part of the jointed bracket arm.

Referring now more particularly to the illustrated embodiment of the invention, a jointed bracket arm comprising inner and outer rigid, tubular lever arms 1 and 2, is journalled on a pivot pin 3 threadedly engaging a hollow support 4, for limited angular displacement on a horizontal axis corresponding to the pivot pin axis.

The lever arm 2 is mounted on a hinge pin 5 threadedly engaging the lever arm 1, the hinge pin axis being parallel or substantially parallel to the pivot axis of the pivot pin 3.

A lamp housing 6 of suitable configuration is carried by the lever arm 2 at the outer end of the latter. Advantageously, the housing 6 may be flexibly secured to the arm 2 as by a ball and socket connection 7 and is preferably equipped with one or more fluorescent lamps 8 to which electric power is adapted to be supplied in known manner by leads (not shown) concealed in the bracket arm which they traverse from the support 4 through the hollow interior of the tubular lever members 1 and 2.

The hollow support 4 is provided with a hollow boss 9 having a cylindrical bore 10, by which the support is adapted to be journalled in a combined ballast-clamping unit 11, for pivotal movement on the cylinder axis. The bore 10 provides an opening through which electric wiring leads from the ballast member of the unit 11 are adapted to enter the support 4.

The support 4 is formed at its top with an opening 12 suitably dimensioned to permit of a substantially 90° movement of the lever arm 1 on pivot pin 3 between a substantially vertical and a substantially horizontal position, as indicated in Fig. 1. Access to the interior of the support is provided for by a cover 13 which constitutes one side of the support and is removably secured in place as by means of bolts 14 threadedly engaging the support. The interior of the support is divided by a transverse partition 15, having an opening 16, into an upper, or cam, compartment 17 and a lower, or spring, compartment 18.

A coil compression spring 19 preferably of uniform diameter is confined in the lower compartment 18 with one end of the spring bearing on the partition 15 in substantial alignment with the opening 16. A tubular spring fitting 20 suitably dimensioned so to be telescopically received easily within the spring bore is provided with an annular seat 21 for engaging the end of the spring and compressing the spring against the partition 15 after the manner shown in Fig. 1. The spring fitting 20 is provided with a central slot 22 suitably dimensioned to permit a flexible link 23 to be threaded therethrough coaxially of the spring 19. The link 23 having an eye portion 24 at each end, is advantageously a metal ribbon connected by a pin 25 passing through one of the eye portions 24, to lever arm 2 at a locus to constitute the latter a first class lever. The other end of the link is connected to the spring 19 through the fitting 20 and retaining pin 26 inserted in the eye portion at that end. The pin 26 is of a length adequate to engage the underside of the fitting 20 beyond the slot ends so that upward pull on the link 23 exerted by lever arm 2 will be transmitted through the pin 26 and fitting 20 to the spring 19, thereby to compress the latter axially in proportion to the force exerted on the link. An opening 27 in the top of the fitting is provided for axial passage of the wiring leads aforementioned through the bore of spring 19 and seriatum through the opening 16, lever arm 1 and lever arm 2 to the lamp 6. Such leads have been omitted since their presence would only serve to confuse the showing of the drawings.

A cam 28 in the upper compartment 17 is journalled concentrically on the pivot pin 3 for limited angular displacement on the pivot pin axis. The cam is provided with an arcuate rim portion 29 engaging the link 23 in running relation thereto and serving to maintain the link in determined radially spaced relation to the cam or pivot pin axis. The cam, as here preferably embodied, has a circular rim portion 29 of a radius such that the longitudinal axis of the spring 19 will be tangent or substantially tangent to the rim throughout the arc of movement of the cam. Thus, not only will the direction of pull on the spring by the link 23 at all times coincide with the spring deflection axis so as to maintain uniform the action of the spring, but the spring deflection will be directly proportional to the angle of movement of the cam. Advantageously, however, the rim portion may be of increasing radius in a counterclockwise direction as viewed in Fig. 1, so that the spring deflection per unit of angular displacement of the cam will be in other than direct proportion.

A segmental fitting 30 integral with and forming a part of the cam 28 serves as a combined closure for the opening 12 in the support 4 and as a socket for threadedly receiving the lever arm 1. To this end, the fitting 30 is provided with a circular rim portion 31 concentric with the rotational axis of the cam and in radially spaced relation to the cam rim 29 so as to provide an annular passage 32 along which the link 23 may move as the cam is angularly displaced. The passage 32 is suitably threaded at one end to receive the hollow lever arm 1 through which the link 23 extends to the pin 25 on lever arm 2, from its point of tangency with the cam rim 31.

The freedom of angular movement of the cam may be varied at will through the provision of annular friction discs 33 mounted on the pivot pin 3. A set of washers 34 and 35, the latter a spring washer, is also mounted on the pivot pin and may be caused to compress the cam between the friction washers with greater or less force by rotation of the pivot pin as will be apparent from Fig. 2.

Although there is little if any tendency for the link 23 to move axially of the pivot pin 3 and hence out of the passage 32, provision is made for closing the side opening of the passage in the form of a cover plate 36 of suitable configuration which is removably secured to the cam as by means of bolts 37 let through openings 38 in the cover plate into threaded engagement with the cam and its extension 30.

The lever arms 1 and 2 terminate each at its hinge end in semi-circular hinge housings 39 and 40, respectively, concentric with the hinge axis of hinge pin 5. The housing 39 is provided with a threaded fitting 41 threadedly engaging the end of lever arm 1 while the housing 40 is provided with a similar fitting 42.

A retaining plate 42′, Fig. 7, of suitable configuration, is mounted on the housing 40 in overlying engagement with a central hub portion 43 journalling the housing 40 on the hinge pin 5, and in overlying engagement with a circular rim flange 44. The plate 42′ serves to retain the link 23 on the link pin 25 and is apertured as at 45 for the passage of hinge pin 5, is apertured as at 46 for passage of link pin 25 integral with housing 40 and is apertured as at 47 for the passage of a bolt 48, Fig. 1, threadedly engaging the hub-portion 43 for holding the cover in place.

An annular friction washer 49 is mounted on the hinge pin 5 between the housings 39 and 40. Spring washers 50 also mounted on the hinge pin between the head thereof and the plate 42′ permit of varying the compression pressure on the friction washer and hence the resistance offered to freedom of movement of the lever arms on the hinge pin, by suitable manipulation of the hinge pin which threadedly engages the housing 39.

A housing closure cover 51, Fig. 6, of suitable configuration is mounted on the housing 39 in overlying engagement with the circular rim flange 52 of the housing and the fitting 41, the cover being apertured as at 53 for the passage of cover retaining bolts 54 and 55 let into threaded engagement with the rim flange 52 and fitting 41, respectively.

As will be apparent from Fig. 1, the link pin 25 fixes the locus of connection of the link 23 to the lever arm 2. It will be apparent also that this locus is radially offset from the hinge pin 5 in a direction to constitute the lever arm 2 a first-class lever. Manifestly, as the lever arm 2 is moved from the full line position shown in Fig. 1 to the horizontal dash-dot line position in the same figure, the moment arm of the link 23 about the hinge pin 5 will increase. The unbalanced force arising from this new position of the lever arm 2 will be equilibrated by simultaneous sliding movement of the spring-tensioned link 23 on the arcuate surface 29 of cam 28 carrying the lever arm 1 on the pivot pin 3 to the extent necessary to restore the balance of forces acting on the jointed bracket arm in the new position, as will be clearly apparent to those skilled in the art.

It will be noted that the link 23 forms a tangent between its point of connection to the lever arm 2 and the arcuate surface 29 of the cam 28. It will be noted also that this tangent is at an acute angle to the plane of the axes of the pivot pin 3 and the hinge pin 5. Thus, movement of the lever arm 1 on the pivot pin 3 necessarily results in relative sliding movement of the link 23 on the cam surface 28 to effect a compression or expansion of the coil spring 19 as the link 23 moves axially thereof within the spring proper in arriving at the new equilibrium position of the spring and the jointed bracket arm.

The invention in its broader aspects is not limited to the specific embodiment shown and described but departures may be made therefrom within the scope of the accompanying claims without departing from the principles of the invention and without sacrificing its chief advantage.

What is claimed is:

1. An adjustable lamp bracket structure comprising mounting means including a hollow support mounted for pivotal movement on a substantially vertical axis, said support having a top opening, a removable side access cover and a partition dividing the support interior into an upper compartment and a lower compartment, said partition having an opening; a coil compression spring in said lower compartment bearing at one end on said partition; a flexible link leading from said support, said link having a terminal portion within said support passing from said upper compartment through said partition opening into said lower compartment coaxially of said spring; a fitting detachably connecting said terminal portion within said support to the other end of said coil spring, said fitting having an opening for the passage of wiring therethrough and serving to compress said spring when said link is tensioned; a cam in said upper compartment mounted for limited angular displacement on a normally horizontal axis, said cam having a curved rim portion in slidable engagement with said flexible link, for maintaining said flexible link in determined radially spaced relation to the cam axis; adjustable means for varying the frictional resistance between said support and cam, to restrict free angular displacement of said cam; a fitting carried by said cam forming a movable closure for the top opening of said support; an elongated tubular cam-actuating lever carried by said closure fitting and extending outwardly therefrom in a direction at right angles to said normally horizontal cam axis, said lever housing said flexible link outside said support; and, a tubular load-supporting lever to which the outer end of said link is connected, said load-supporting lever being hinged adjacent one end to said cam-actuating lever, for pivotal movement relative thereto on an axis paralleling the cam axis, said levers together forming a jointed bracket arm, and said link operatively engaging said load-carrying lever at a locus radially spaced from said hinge axis to constitute the load-carrying lever a first class lever, said link also forming substantially a tangent between said locus and a point on said curved rim portion of said cam.

2. The device of claim 1 in which said levers are provided each with a hinge housing at their respective hinge ends, said housings being concentric with the hinge axis.

3. An adjustable bracket structure comprising a hollow support having an upper cam compartment and a lower spring compartment; an apertured wall separating said compartments; a coil spring in said lower compartment surrounding said aperture and abutted against said apertured wall; a flexible link connected at one end to said coil spring; a cam in said upper compartment mounted for limited angular displacement on a normally horizontal axis, said cam having a curved rim portion in relatively movable engagement with said flexible link, for maintaining said flexible link in determined radially spaced relation to said normally horizontal cam axis; an elongated cam-actuating lever carried by said cam and extending outwardly therefrom in a direction at right angles to said normally horizontal cam axis; and, a load-supporting lever to which the outer end of said link is connected, said load-supporting lever being hinged adjacent one end to said cam-actuating lever, for pivotal movement relative thereto on an axis paralleling said cam axis, said levers together forming a jointed bracket arm, and said link operatively engaging said load-carrying lever at a locus radially spaced from said hinge axis to constitute said load-carrying lever a first class lever, said link also forming substantially a tangent between said locus and a point on said curved rim of said cam.

4. The device of claim 3 in which said link is a metal strap.

5. An adjustable bracket structure comprising a support, an arcuate cam means pivotally mounted on said support for limited angular displacement on a normally horizontal axis, said cam means having a curved rimmed portion in determined radially spaced relation to said horizontal axis; a cam actuating lever fixedly connected directly to said cam means adjacent one end of said rim portion and extending outwardly therefrom in a direction at right angles to said horizontal axis of the cam means; a load-supporting lever hinged to said cam actuating lever at its outward end for pivotal movement relative thereto on a hinge axis paralleling said horizontal axis of the cam means, said levers together forming a jointed bracket arm; and, elastic means for equilibrating said bracket arm on said cam axis comprising spring means carried by said support below said cam means, and a flexible link connected to said spring means in substantial axial alignment therewith traversing said cam actuating lever in sliding engagement with the curved rim portion of said cam means for coupling said spring means to said load-supporting lever, said link being connected to said load-supporting lever at a locus radially spaced from said hinge axis to constitute the lever a first class lever, and forming substantially a tangent between said locus and a point on said curved rim portion of said cam means.

FERDINAND A. DE WIESS.

References Cited in the file of this patent

UNITED STATES PATENTS

| Number | Name | Date |
|---|---|---|
| 1,046,573 | Ellis | Dec. 10, 1912 |
| 1,556,917 | Dee | Oct. 13, 1925 |
| 2,076,446 | Carwardine | Apr. 6, 1937 |
| 2,090,439 | Carwardine | Aug. 17, 1937 |
| 2,416,910 | Crosby et al. | Mar. 4, 1947 |